(12) United States Patent
Webber

(10) Patent No.: US 7,722,988 B2
(45) Date of Patent: May 25, 2010

(54) ALL-TEMPERATURE LIFES$_2$ BATTERY WITH ETHER AND LOW CONCENTRATION LII ELECTROLYTE

(75) Inventor: Andrew Webber, Avon Lake, OH (US)

(73) Assignee: Eveready Battery Company, Inc., St. Louis, MO (US)

(*) Notice: Subject to any disclaimer, the term of this patent is extended or adjusted under 35 U.S.C. 154(b) by 22 days.

(21) Appl. No.: 12/172,538

(22) Filed: Jul. 14, 2008

(65) Prior Publication Data

US 2009/0061293 A1 Mar. 5, 2009

Related U.S. Application Data

(63) Continuation-in-part of application No. 11/204,694, filed on Aug. 16, 2005, now abandoned.

(51) Int. Cl.
*H01M 4/00* (2006.01)

(52) U.S. Cl. ............... 429/221; 429/231.95; 429/231.1; 429/94; 429/322; 429/329; 429/337; 429/335; 429/339; 429/328

(58) Field of Classification Search .......... 429/221, 429/231.95, 231.1, 94, 322, 329, 337, 335, 429/339, 328
See application file for complete search history.

(56) References Cited

U.S. PATENT DOCUMENTS

| | | | |
|---|---|---|---|
| 3,941,612 A | 3/1976 | Steunenberg et al. |
| 3,996,069 A | 12/1976 | Kronenberg |
| 4,129,691 A | 12/1978 | Broussley |
| 4,450,214 A | 5/1984 | Davis et al. |
| 4,804,595 A | 2/1989 | Bakos et al. |
| 4,851,308 A | 7/1989 | Akhtar |
| 4,952,330 A | 8/1990 | Leger et al. |
| 4,959,282 A | 9/1990 | Dahn et al. |
| 5,229,227 A | 7/1993 | Webber |
| 5,290,414 A | 3/1994 | Marple |
| 5,432,030 A | 7/1995 | Vourlis et al. |
| 5,478,673 A | 12/1995 | Funatsu |
| 5,514,491 A | 5/1996 | Webber |
| 5,597,663 A | 1/1997 | Pendalwar et al. |
| 5,691,083 A | 11/1997 | Bolster |
| 5,919,587 A | 7/1999 | Mukherjee et al. |
| 6,201,100 B1 | 3/2001 | Gorkovenko et al. |
| 6,218,054 B1 | 4/2001 | Webber |
| 6,329,103 B1 | 12/2001 | Ishiko et al. |
| 6,436,583 B1 | 8/2002 | Mikhaylik et al. |
| 6,569,573 B1 | 5/2003 | Mikhaylik et al. |
| 6,576,373 B1 | 6/2003 | Iwamoto et al. |

(Continued)

FOREIGN PATENT DOCUMENTS

EP 0529802 A 3/1993

(Continued)

OTHER PUBLICATIONS

Pending U.S. Appl. No. 11/787,436, filed on Apr. 16, 2007.

*Primary Examiner*—Laura S Weiner
(74) *Attorney, Agent, or Firm*—Robert C. Baraona

(57) ABSTRACT

A lithium electrochemical cell design incorporating a low molality electrolyte including LiI is disclosed. The resulting cell delivers excellent performance under a wide range of temperatures, conditions and drain rates.

3 Claims, 3 Drawing Sheets

U.S. PATENT DOCUMENTS

| | | | |
|---|---|---|---|
| 6,630,272 B1 | 10/2003 | Iwamoto et al. | |
| 6,689,511 B2 | 2/2004 | Yamada et al. | |
| 6,849,360 B2 * | 2/2005 | Marple | 429/221 |
| 7,019,494 B2 | 3/2006 | Mikhaylik | |
| 7,157,185 B2 * | 1/2007 | Marple | 429/221 |
| 7,189,477 B2 | 3/2007 | Mikhaylik | |
| 7,316,868 B2 | 1/2008 | Gorkovenko | |
| 7,459,237 B2 | 12/2008 | Totir et al. | |
| 2002/0028389 A1 | 3/2002 | Sonoda et al. | |
| 2002/0039677 A1 | 4/2002 | Iwamoto et al. | |
| 2002/0102464 A1 | 8/2002 | Yoshida et al. | |
| 2003/0170546 A1 | 9/2003 | Boon et al. | |
| 2003/0228518 A1 | 12/2003 | Marple | |
| 2004/0202936 A1 | 10/2004 | Mikhaylik | |
| 2005/0079413 A1 * | 4/2005 | Schubert | 429/221 |
| 2005/0112462 A1 | 5/2005 | Marple | |
| 2005/0233214 A1 | 10/2005 | Marple et al. | |
| 2005/0244706 A1 | 11/2005 | Wu et al. | |
| 2006/0046154 A1 | 3/2006 | Webber et al. | |
| 2007/0275298 A1 | 11/2007 | Igoris | |
| 2008/0026288 A1 | 1/2008 | Marple et al. | |
| 2008/0026290 A1 | 1/2008 | Jiang et al. | |

FOREIGN PATENT DOCUMENTS

| | | |
|---|---|---|
| EP | 550262 A | 7/1993 |
| EP | 1439591 A | 7/2004 |
| GB | 1522218 A | 8/1978 |
| JP | 59151769 A | 8/1984 |
| JP | 04162363 A | 6/1992 |
| WO | 0036683 | 6/2000 |
| WO | 0046870 A1 | 8/2000 |
| WO | 0135483 A | 5/2001 |
| WO | 2005069409 A | 7/2005 |
| WO | 2005078851 A | 8/2005 |

* cited by examiner

US 7,722,988 B2

ALL-TEMPERATURE LIFES₂ BATTERY WITH ETHER AND LOW CONCENTRATION LII ELECTROLYTE

BACKGROUND OF INVENTION

The following application is a continuation-in-part of U.S. patent application Ser. No. 11/204,694 entitled "Low Temperature Li/FeS₂ Battery" filed on Aug. 16, 2005 which is now abandoned.

This invention relates to a nonaqueous electrolyte for a primary electrochemical cell, such as a lithium/iron disulfide cell. More specifically, a lithium-iron disulfide cell with discharge capacity at temperatures between −40° C. and 21° C. and an electrolyte consisting essentially of a solute with concentrations of lithium iodide 0.3 to 0.5 molal dissolved in an all-ether solvent is contemplated.

Batteries are used to provide power to many portable electronic devices. In today's consumer-driven device market, standardized primary cell sizes (e.g., AA or AAA) and specific nominal voltages (typically 1.5 V) are preferred. Moreover, consumers frequently opt to use primary batteries for their low cost, convenience, reliability and sustained shelf life as compared to comparable, currently available rechargeable (i.e., secondary) batteries. Primary lithium batteries (those that contain metallic lithium or lithium alloy as the electrochemically active material of the negative electrode) are becoming increasingly popular as the battery of choice for new devices because of trends in those devices toward smaller size and higher power.

One type of lithium battery that is particularly useful for 1.5 V consumer devices is the lithium-iron disulfide (or LiFeS₂) battery, having the IEC designations FR6 for AA size and FR03 for AAA size. LiFeS₂ cells offer higher energy density, especially at high drain rates in comparison to alkaline, carbon zinc or other primary (i.e., non-rechargeable) battery systems. Such batteries use iron disulfide, FeS₂ (also referred to as pyrite or iron pyrite, which the preferred mineral form of iron disulfide for battery applications), as the electrochemically active material of the positive electrode.

As a general rule, the electrolyte in any battery must be selected to provide sufficient electrolytic and electrical conductivity to meet the cell discharge requirements over the desired temperature range. As demonstrated by U.S. Pat. No. 4,129,691 to Broussely, increasing the solute (i.e., salt) concentration in a lithium battery electrolyte is expected to result in a corresponding increase in the conductivity and usefulness of that electrolyte (at least to a certain point), with higher conductivity presumed to be a desirable attribute. However, other limitations—such as the solubility of the solute in specific solvents, the formation of an appropriate passivating layer on lithium-based electrodes and/or the compatibility of the solvent with the electrochemically active or other materials in the cell—make the selection of an appropriate electrolyte system difficult. As a non-limiting example, U.S. Pat. No. 4,804,595 to Bakos describes how certain ethers are not miscible with solvents such as propylene carbonate. Additional electrolyte deficiencies and incompatibilities are well known and documented in this art, particularly as they relate to LiFeS₂ cells and lithium's reactivity with many liquids, solvents and common polymeric sealing materials.

Ethers are often desirable as lithium battery electrolyte solvents because of their generally low viscosity, good wetting capability, good low temperature discharge performance and good high rate discharge performance, although their polarity is relatively low compared to some other common solvents. Ethers are particularly useful in cells with pyrite because the cells tend to be more stable as compared to higher voltage cathode materials in ethers, where degradation of the electrode surface or unwanted reactions with the solvent(s) might occur (e.g., polymerization). Among the ethers that have been used in LiFeS₂ cells are 1,2-dimethoxyethane (DME) and 1,3-dioxolane (DIOX), whether used together as taught by U.S. Pat. Nos. 5,514,491 or 6,218,054 or European Patent 0 529 802 B1, all to Webber, or used in whole or in part as a blend of solvents as suggested by U.S. Pat. Nos. 7,316,868 to Gorkovenko (use of DIOX and 5-6 carbon 1,3-dialkoxyalkanes); U.S. Pat. No. 4,952,330 to Marple et al. (use of a set ratio of linear ethers, such as DME, cylic ethers, such as DIOX, and alkylene carbonates, such as propylene carbonate); U.S. Pat. No. 3,996,069 to Kronenberg (use of 3-methyl-2-oxazolidone and DIOX and/or DME); or U.S. Patent Publication No. 2008/0026296A1 to Bowden (use of sulfolane and DME). Other solvents not specifically containing DIOX or DME may also be possible, such as those disclosed in U.S. Pat. No. 5,229,227 to Webber (use of 3-methyl-2-oxazolidone with polyalkylene glycol ethers such as diglyme). However, because of interactions among solvents, as well as the potential effects of solutes and/or electrode materials on those solvents, ideal electrolyte solvent blends and the resulting discharge performance of the cell are often difficult to predict without actually testing the proposed blend in a functioning electrochemical cell.

A wide variety of electrolyte solutes has been used for lithium-based cells, including lithium iodide (LiI), lithium trifluoromethanesulfonate (LiCF₃SO₃ or "lithium triflate"), lithium bistrifluoromethylsulfonyl imide (Li(CF₃SO₂)₂N or "lithium imide"), lithium perchlorate (LiClO₄), lithium hexafluoroarsenate (LiAsF₆) and others. While electrolytes containing lithium triflate can provide fair cell electrical and discharge characteristics, such electrolytes have relatively low electrical conductivity, lithium triflate is relatively expensive. Lithium iodide (LiI) has been used as an alternative to lithium triflate to both reduce cost and improve cell electrical performance, as discussed in the previously identified U.S. Pat. No. 5,514,491 to Webber. One particular brand of AA—sized FR06 batteries sold by Energizer Holdings Inc.—currently includes a nonaqueous electrolyte with an approximate 0.75 molal concentration of LiI salt in a solvent mixture containing DIOX and DME.

Additives may be employed in the electrolyte to enhance certain aspects of a cell and/or its performance. For example, U.S. Pat. No. 5,691,083 to Bolster describes the use of a very low concentration of potassium salt additives to achieve a desired open circuit voltage in cells with a cathode material including FeS₂, MnO₂ or TiS₂. U.S. Publication No. 2008/0026290 to Jiang discloses the use of an aluminum additive to slow the development of a passivation film on the surface of the lithium electrode. In each of these examples, the benefit of the additive(s) selected must be balanced against any deleterious reactions or effects (in terms of discharge performance, safety and longevity of the battery).

Finally, as mentioned above, it is believed higher concentrations of solute(s) normally improve the conductivity of the electrolyte, although it is understood that there is ultimately a limit to this effect based upon certain variables, such as the viscosity of the solution (i.e., conductivity improves with concentration until the concentration makes the resulting solution too viscous, at which point conductivity drops off dramatically). Additionally, certain systems (typically in rechargeable lithium-sulfur battery systems where non-chalcogenic polysulfides are the preferred cathode material) utilize a "catholyte" where portions of the electrode itself dissolve into the electrolyte solution to provide ionic conductivity, such that the concentration of salt is an indicator as to the state of charge in the battery. In such systems, minimal to non-existent concentrations of lithium ions may be provided to a fully charged cell without compromising performance as taught by U.S. Pat. No. 7,189,477 to Mikhaylik. Ultimately, $LiFeS_2$ and other lithium electrochemical cells maintain an almost constant salt content in the electrolyte and do not exhibit this propensity to provide ions from the electrodes to the electrolyte. Therefore, catholyte systems have no relevance to $LiFeS_2$ systems in this regard, and more generally illustrate the pitfalls associated with blindly applying teachings from a given electrochemical system to another, dissimilar system.

SUMMARY OF INVENTION

An electrochemical cell with improved low temperature performance is contemplated. The cell has an anode made of lithium or lithium alloy, such as lithium with less than 1% aluminum. The cathode includes iron disulfide coated onto a current collector, although any material with a potential versus lithium of less than or equal to 2.8 V may be considered. A separator is disposed between the two electrodes. The electrodes may be spirally wound into a jellyroll electrode assembly.

The electrolyte consists of a 0.5 molal lithium iodide dissolved in a solvent blend that includes 1,3-dioxolane and at least one acyclic ether, such as 1,2-dimethoxyethane or diglyme. Additional, optional cosolvents, such as 3,5-dimethylisoxazole, can be included. The optimal amount of dioxolane in the electrolyte is between 60 to 70 volume percent.

The resulting cell delivers significantly increased capacity at low temperatures while sacrificing little, if any capacity at room temperature. At a $C_{15}$ drain rate (e.g., 200 mA continuous for a AA sized cell), a cell according to the invention delivers at least 1000 mAh at −40° C. and over 2800 mAh at room temperature (i.e., 21° C.).

DETAILED DESCRIPTION OF INVENTION

As used herein the terms listed below are defined and used throughout this disclosure as follows:
 ambient (or room) temperature—between about 20° C. and about 25° C.; unless otherwise stated, information is provided at ambient temperature.
 anode—the negative electrode; more specifically, within the meaning of the invention, it consists essentially of lithium or an alloy containing at least 90% lithium by weight as the primary electrochemically active material.
 cathode—the positive electrode; more specifically, within the meaning of the invention, it comprises iron disulfide as the primary electrochemically active material, along with one or more Theological, polymeric and/or conductive additives, coated onto a metallic current collector.
 cell housing—the structure that physically encloses the electrochemically active materials, safety devices and other inert components which comprise a fully functioning battery; typically consists of a container (formed in the shape of a cup, also referred to as a "can") and a closure (fitting over the opening of the container, typically consists of venting and sealing mechanisms for impeding electrolyte egress and moisture/atmospheric ingress).
 DIOX—a dioxolane-based solvent, typically 1,3-dioxolane
 DME—a dimethoxyethane-based solvent, typically 1,2-dimethoxyethane
 electrolyte—one or more solutes dissolved within one or more liquid, organic solvents; but this definition does not include electrochemical systems where the cathode is expected to partially or completely dissolve in order to contribute ionic conductivity to the cell (i.e., a "catholyte" such as those utilized in lithium-sulfur batteries)
 jellyroll (or spirally wound) electrode assembly—strips of anode and cathode, along with an appropriate polymeric separator, are combined into an assembly by winding along their lengths or widths, e.g., around a mandrel or central core.
 nominal—a value, specified by the manufacturer, that is representative of what can be expected for that characteristic or property.
 salt—as part of the electrolyte, an ionizable compound, typically including lithium or some other metal, dissolved in one or more solutes.

Cell Design

Figure 1:
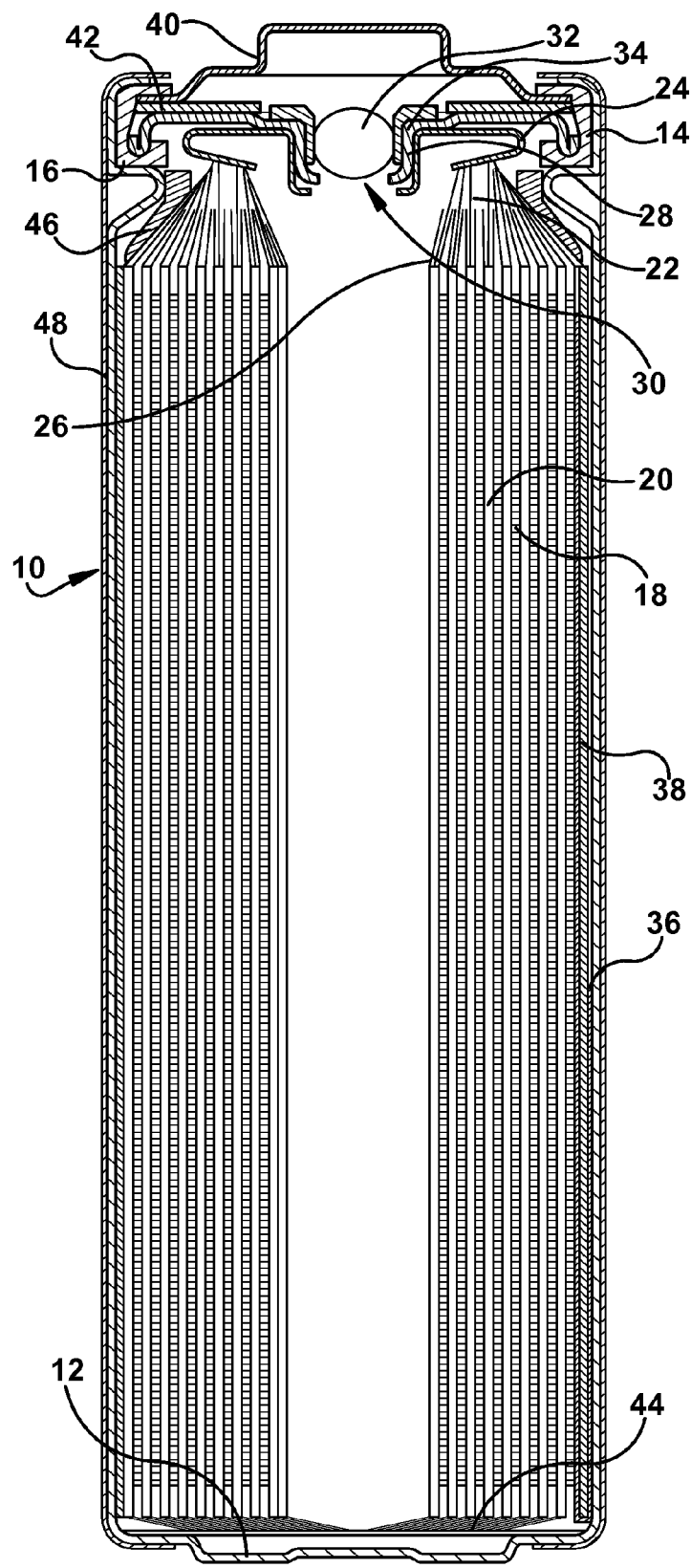
FIG. 1 shows a cross sectional view of a $LiFeS_2$ battery according to one embodiment of the invention.

The invention will be better understood with reference to FIG. 1, which shows a specific cell design that may be implemented. Cell 10 is an FR6 type cylindrical $LiFeS_2$ battery cell, although the invention should have equal applicability to FR03 or other cells. Cell 10 has a housing that includes a container in the form of a can 12 with a closed bottom and an open top end that is closed with a cell cover 14 and a gasket 16. The can 12 has a bead or reduced diameter step near the top end to support the gasket 16 and cover 14. The gasket 16 is compressed between the can 12 and the cover 14 to seal an anode or negative electrode 18, a cathode or positive electrode 20 and electrolyte within the cell 10.

The anode 18, cathode 20 and a separator 26 are spirally wound together into an electrode assembly. The cathode 20 has a metal current collector 22, which extends from the top end of the electrode assembly and is connected to the inner surface of the cover 14 with a contact spring 24. The anode 18 is electrically connected to the inner surface of the can 12 by a metal lead (or tab) 36. The lead 36 is fastened to the anode 18, extends from the bottom of the electrode assembly, is folded across the bottom and up along the side of the electrode assembly. The lead 36 makes pressure contact with the inner surface of the side wall of the can 12. After the electrode assembly is wound, it can be held together before insertion by tooling in the manufacturing process, or the outer end of material (e.g., separator or polymer film outer wrap 38) can be fastened down, by heat sealing, gluing or taping, for example.

An insulating cone 46 is located around the peripheral portion of the top of the electrode assembly to prevent the cathode current collector 22 from making contact with the can 12, and contact between the bottom edge of the cathode 20 and the bottom of the can 12 is prevented by the inward-folded extension of the separator 26 and an electrically insulating bottom disc 44 positioned in the bottom of the can 12.

Cell 10 has a separate positive terminal cover 40, which is held in place by the inwardly crimped top edge of the can 12 and the gasket 16 and has one or more vent apertures (not shown). The can 12 serves as the negative contact terminal.

An insulating jacket, such as an adhesive label 48, can be applied to the side wall of the can 12.

Disposed between the peripheral flange of the terminal cover 40 and the cell cover 14 is a positive temperature coefficient (PTC) device 42 that substantially limits the flow of current under abusive electrical conditions. Cell 10 also includes a pressure relief vent. The cell cover 14 has an aperture comprising an inward projecting central vent well 28 with a vent hole 30 in the bottom of the well 28. The aperture is sealed by a vent ball 32 and a thin-walled thermoplastic bushing 34, which is compressed between the vertical wall of the vent well 28 and the periphery of the vent ball 32. When the cell internal pressure exceeds a predetermined level, the vent ball 32, or both the ball 32 and bushing 34, is forced out of the aperture to release pressurized gases from the cell 10. In other embodiments, the pressure relief vent can be an aperture closed by a rupture membrane, such as disclosed in U.S. Patent Application Publication No. 2005/0244706, herein fully incorporated by reference, or a relatively thin area such as a coined groove, that can tear or otherwise break, to form a vent aperture in a portion of the cell, such as a sealing plate or container wall.

The terminal portion of the electrode lead 36, disposed between the side of the electrode assembly and the side wall of the can, may have a shape prior to insertion of the electrode assembly into the can, preferably non-planar that enhances electrical contact with the side wall of the can and provides a spring-like force to bias the lead against the can side wall. During cell manufacture, the shaped terminal portion of the lead can be deformed, e.g., toward the side of the electrode assembly, to facilitate its insertion into the can, following which the terminal portion of the lead can spring partially back toward its initially non-planar shape, but remain at least partially compressed to apply a force to the inside surface of the side wall of the can, thereby making good physical and electrical contact with the can.

Electrolyte

A nonaqueous electrolyte, containing water only in very small quantities as a contaminant (e.g., no more than about 500 parts per million by weight, depending on the electrolyte salt being used), is deposited into the cell housing during manufacture. Because the electrolyte is the primary media for ionic transfer in a $LiFeS_2$ cell, selection of an appropriate solvent and solute combination is critical to optimizing the performance of the cell. Moreover, the solute and solvents selected for the electrolyte must possess appropriate miscibility and viscosity for the purposes of manufacture and use of the resulting cell, while still delivering appropriate discharge performance across the entire spectrum of temperatures potentially experienced by batteries (i.e., about −40° C. to 60° C.). Furthermore, the electrolyte must be non-reactive and non-volatile (or at least possess a low enough boiling point to be practically retained by conventional polymeric seals and closure mechanisms).

Miscibility and viscosity of the solvents and the electrolyte are key to the manufacturing and operational aspects of the battery. All solvents used in the blend must be completely miscible to insure a homogeneous solution. Similarly, in order to accommodate the requirements of high volume production, the solvents must possess a sufficiently low viscosity to flow and/or be dispensed quickly.

Additionally, the solvents and the electrolyte must possess a boiling point appropriate to the temperature range in which the battery will most likely be exposed and stored (i.e., −40° C. to 60° C.). More specifically, the solvent(s) must be sufficiently non-volatile to allow for safe storage and operation of the battery within this stated temperature range. Similarly, the solvents and the electrolyte must not react with the electrode materials in a manner that degrades the electrodes or adversely affects performance of the battery upon discharge. Suitable organic solvents that have been or may be used in $LiFeS_2$ cells have included one or more of the following: 1,3-dioxalane; 1,3-dioxolane based ethers (e.g., alkyl- and alkoxy-substituted DIOX, such as 2-methyl-1,3-dioxolane or 4-methyl-1,3-dioxolane, etc.); 1,2-dimethoxyethane; 1,2-dimethoxyethane-based ethers (e.g., diglyme, triglyme, tetraglyme, ethyl glyme, etc.); ethylene carbonate; propylene carbonate; 1,2-butylene carbonate; 2,3-butylene carbonate; vinylene carbonate; methyl formate; γ-butyrolactone; sulfolane; acetonitrile; N,N-dimethyl formamide: N,N-dimethylacetamide; N,N-dimethylpropyleneurea; 1,1,3,3-tetramethylurea; beta aminoenones; beta aminoketones; methyltetrahydrofurfuryl ether; diethyl ether; tetrahydrofuran ("THF"); 2-methyl tetrahydrofuran; 2-methoxytetrahydrofuran; 2,5-dimethoxytetrahydrofuran; 3,5-dimethylisoxazole ("DMI"); 1,2-dimethoxypropane ("DMP"); and 1,2-dimethoxypropane-based ethers (e.g., substituted DMP, etc.).

Salts should be nearly or completely soluble with the selected solvent(s) and, as with the discussion of solvent characteristics above, without any degradation or adverse effects. Examples of typical salts used in $LiFeS_2$ cells include LiI ("lithium iodide"), $LiCF_3SO_3$ ("lithium triflate"), $LiClO_4$ ("lithium perchlorate"), $Li(CF_3SO_2)_2N$ ("lithium imide"), $Li(CF_3CF_2SO_2)_2N$, $LiBF_4$ and $Li(CF_3SO_2)_3C$. Other potential candidates are lithium bis(oxalato)borate, lithium bromide, lithium hexafluorophosphate, potassium hexafluorophosphate and lithium hexafluoroarsenate. Two key aspects of salts are that they do not react appreciably with the housing, electrodes, sealing materials or solvents and that they do not degrade or precipitate out of the electrolyte under the typically expected conditions the battery will be exposed to (e.g., temperature, electrical load, etc.). It is possible to use more than one solute to maximize certain aspects of performance.

Notably, unless noted to the contrary, the concentration of the solutes relative to the solvents as described herein is best expressed as moles of solute per kilogram of solution (molality). Molality of a solution remains constant irrespective of the physical conditions like temperature and pressure, whereas volume of some solvents typically increases with in temperature thereby yielding a decrease in molarity (i.e., moles per liter).

As noted above, the Broussely patent teaches that higher salt concentration results in better performance. Specifically, virtually all of the solvents studied by Broussely display increasing conductivity as the lithium perchlorate concentration is initially increased and, in the case of dioxalane (line C in FIGS. 1 and 2 of Broussely), conductivity continues to increase along with perchlorate concentration.

The Examples in the '491 Webber patent further support this previous understanding. Table 4 shows an increase in the recovery time required on a flash test as the molarity of separate lithium triflate and lithium iodide concentrations in an ether electrolyte are decreased. Similarly, in Table 5, larger voltage drops are experienced as both the concentration and volume of the electrolyte is decreased.

Greater emphasis is now being placed on a battery's ability to perform across a wide range of temperatures. In that regard, $LiFeS_2$ batteries are particularly attractive because, unlike other widely available consumer-sized cells (e.g., alkaline, carbon zinc), $LiFeS_2$ retains an ability to deliver capacity at temperatures well below freezing. In turn, this creates the possibility for using such batteries in remote sensors, aircraft, military or automotive applications.

Lithium iodide and lithium triflate salts have been used in combination to provide improved low temperature discharge performance, as described in related U.S. Patent Publication No. 2006/0046154 to Webber. As discussed therein, $LiFeS_2$ cells with a high ether content and LiI as a solute (either the sole solute or in combination with lithium triflate) may sometimes, on high rate discharge at low temperatures, exhibit a rapid drop in voltage near the beginning of discharge. The voltage can drop so low that a device being powered by the cell will not operate. Eliminating LiI as a solute and making lithium triflate the sole solute can solve this problem, but the operating voltage can then be too low on high rate and high power discharge at room temperature.

Accordingly, subsequent to the filing of the '154 Publication, the viability of LiI electrolytes at low temperatures was re-examined. As criteria (and in keeping with the expectations for consumers of primary batteries), acceptable electrolytes must be economical and provide discharge service across the entire spectrum of commercial and industrial usage conditions, i.e., $-40°$ C. up to at least $60°$ C.

It was discovered, quite unexpectedly, that cutting the concentration of LiI in ether solvents (e.g., DIOX, DME, etc.) below the previously believed threshold of 0.5 M still provided comparable room temperature and, more importantly, exhibited enormous and surprising service improvements at extremely low temperatures. Specifically, while 0.75 molal LiI dissolved in a DIOX:DME ether blend of 65:35 volume percent is the most common and most studied formulation for current $LiFeS_2$ cells, it was discovered that concentrations 0.4 molal and 0.35 molal LiI in the same solvent blend delivered at least twice the capacity of the prior art formulation at $-40°$ C., irrespective of the drain rate. At some rates, the reduced concentration LiI provided exponentially better capacity. Furthermore, it was discovered that the solvent blend was most optimal when it contained at least 50 volume percent of DIOX and, more preferably, 65 volume percent of DIOX.

It is believed that, by reducing cutting the "normal" concentration of LiI in half, significant benefits can be realized at low temperatures without sacrificing too much capacity at room temperature. At the same time, this reduction in the amount of solute required also allows a manufacturer to realize a cost savings, especially to the extent that the electrolyte is one of the more expensive raw materials provided to the cell.

As a further unexpected result, this discovery appears to be limited only to LiI solutes in ether-based solvent blends. Some solutes, such as lithium perchlorate, failed to deliver any significant levels of capacity at temperatures below $-20°$ C. Other solutes, such as lithium triflate, behaved according to the teachings of the prior art—that is, higher concentrations generally delivered higher capacity. Finally, solutes such as lithium imide were not substantially impacted by the concentration of solute provided; however, imide solutes do not provide acceptable long term stability with respect to open circuit voltage ("OCV") and, in comparison to lithium iodide, lithium imide is significantly more expensive.

Concentrations of 0.4 molal or less of LiI solute are considered to be the preferred concentrations for this invention, while the most preferred blend of ethers is about 65 vol. % DIOX and about 35 vol. % DME, with trace levels (i.e., <0.5 vol. %) DMI optionally provided. Other ethers, such as those identified above, and/or additional cosolvents may also be used. Similarly, the volume percent of ethers may be varied. In particular, 10-90 vol. % DIOX and/or DIOX-based ether(s) may be combined with 10-90 vol. % of one or more acyclic ethers, such as DME, DMP, DME-based ethers and the like. The anode and cathode materials may also be varied, as described in further detail below.

Other Cell Components

The cell container is often a metal can with a closed bottom such as the can in FIG. 1. The can material will depend in part of the active materials and electrolyte used in the cell. A common material type is steel. For example, the can may be made of steel, plated with nickel on at least the outside to protect the outside of the can from corrosion. The type of plating can be varied to provide varying degrees of corrosion resistance or to provide the desired appearance. The type of steel will depend in part on the manner in which the container is formed. For drawn cans the steel can be a diffusion annealed, low carbon, aluminum killed, SAE 1006 or equivalent steel, with a grain size of ASTM 9 to 11 and equiaxed to slightly elongated grain shape. Other steels, such as stainless steels, can be used to meet special needs. For example, when the can is in electrical contact with the cathode, a stainless steel may be used for improved resistance to corrosion by the cathode and electrolyte.

The cell cover can be metal. Nickel plated steel may be used, but a stainless steel is often desirable, especially when the cover is in electrical contact with the cathode. The complexity of the cover shape will also be a factor in material selection. The cell cover may have a simple shape, such as a thick, flat disk, or it may have a more complex shape, such as the cover shown in FIG. 1. When the cover has a complex shape like that in FIG. 1, a type 304 soft annealed stainless steel with ASTM 8-9 grain size may be used, to provide the desired corrosion resistance and ease of metal forming. Formed covers may also be plated, with nickel for example.

The terminal cover should have good resistance to corrosion by water in the ambient environment, good electrical conductivity and, when visible on consumer batteries, an attractive appearance. Terminal covers are often made from nickel plated cold rolled steel or steel that is nickel plated after the covers are formed. Where terminals are located over pressure relief vents, the terminal covers generally have one or more holes to facilitate cell venting.

The gasket is made from any suitable thermoplastic material that provides the desired sealing properties. Material selection is based in part on the electrolyte composition. Examples of suitable materials include polypropylene, polyphenylene sulfide, tetrafluoride-perfluoroalkyl vinylether copolymer, polybutylene terephthalate and combinations thereof. Preferred gasket materials include polypropylene (e.g., PRO-FAX® 6524 from Basell Polyolefins in Wilmington, Del., USA) and polyphenylene sulfide (e.g., XTEL™ XE3035 or XE5030 from Chevron Phillips in The Woodlands, Tex., USA). Small amounts of other polymers, reinforcing inorganic fillers and/or organic compounds may also be added to the base resin of the gasket.

The gasket may be coated with a sealant to provide the best seal. Ethylene propylene diene terpolymer (EPDM) is a suitable sealant material, but other suitable materials can be used.

If a ball vent is used, the vent bushing is made from a thermoplastic material that is resistant to cold flow at high temperatures (e.g., $75°$ C.). The thermoplastic material comprises a base resin such as ethylene-tetrafluoroethylene, polybutylene terephthlate, polyphenylene sulfide, polyphthalamide, ethylene-chlorotrifluoroethylene, chlorotrifluoroethylene, perfluoro-alkoxyalkane, fluorinated perfluoroethylene polypropylene and polyetherether ketone. Ethylene-tetrafluoroethylene copolymer (ETFE), polyphenylene sulfide (PPS), polybutylene terephthalate (PBT) and polyphthalamide are preferred. The resin can be modified by adding a thermal-stabilizing filler to provide a vent bushing with the desired sealing and venting characteristics at high temperatures. The bushing can be injection molded from the thermoplastic material. TEFZEL® HT2004 (ETFE resin with 25 weight percent chopped glass filler), polythlalamide (e.g., AMODEL® ET 10011 NT, from Solvay Advanced Polymers, Houston, Tex.) and polyphenylene sulfide (e.g., e.g., XTEL™ XE3035 or XE5030 from Chevron Phillips in The Woodlands, Tex., USA) are preferred thermoplastic bushing materials.

The vent ball itself can be made from any suitable material that is stable in contact with the cell contents and provides the desired cell sealing and venting characteristic. Glasses or metals, such as stainless steel, can be used. In the event a foil vent is utilized in place of the vent ball assembly described above (e.g., pursuant to U.S. Patent Application Publication No. 2005/0244706), the above referenced materials may still be appropriately substituted.

Electrodes

The anode comprises a strip of lithium metal, sometimes referred to as lithium foil. The composition of the lithium can vary, though for battery grade lithium, the purity is always high. The lithium can be alloyed with other metals, such as aluminum, to provide the desired cell electrical performance or handling ease, although the amount of lithium in any alloy should nevertheless be maximized and alloys designed for high temperature application (i.e., above the melting point of pure lithium) are not contemplated. Appropriate battery grade lithium-aluminum foil, containing 0.5 weight percent aluminum, is available from Chemetall Foote Corp., Kings Mountain, N.C., USA.

Other anode materials may be possible, including sodium, potassium, zinc, magnesium and aluminum, either as co-anodes, alloying materials or distinct, singular anodes. Ultimately, the selection of an appropriate anode material will be influenced by the compatibility of that anode with LiI, the cathode and/or the ether(s) selected.

As in the cell in FIG. 1, a separate current collector (i.e., an electrically conductive member, such as a metal foil, on which the anode is welded or coated OR an electrically conductive strip running along the length of the anode) is not needed for the anode, since lithium has a high electrical conductivity. By not utilizing such a current collector, more space is available within the container for other components, such as active materials. Anode current collectors may be made of copper and/or other appropriate high conductivity metals so as long as they are stable when exposed to the other interior components of the cell (e.g., electrolyte).

The electrical connection must be maintained between each of the electrodes and the opposing terminals proximate to or integrated with the housing. An electrical lead 36 can be made from a thin metal strip connecting the anode or negative electrode to one of the cell terminals (the can in the case of the FR6 cell shown in FIG. 1). When the anode includes such a lead, it is oriented substantially along a longitudinal axis of the jellyroll electrode assembly and extends partially along a width of the anode. This may be accomplished embedding an end of the lead within a portion of the anode or by simply pressing a portion such as an end of the lead onto the surface of the lithium foil. The lithium or lithium alloy has adhesive properties and generally at least a slight, sufficient pressure or contact between the lead and electrode will weld the components together. The negative electrode may be provided with a lead prior to winding into a jellyroll configuration. The lead may also be connected via appropriate welds.

The metal strip comprising the lead 36 is often made from nickel or nickel plated steel with sufficiently low resistivity in order to allow sufficient transfer of electrical current through the lead and have minimal or no impact on service life of the cell, with a lead having less than 15 mΩ/cm and preferably less than 4.5 mΩ/cm being ideal. A preferred material is 304 stainless steel. Examples of other suitable negative electrode lead materials include, but are not limited to, copper, copper alloys, for example copper alloy 7025 (a copper, nickel alloy comprising about 3% nickel, about 0.65% silicon, and about 0.15% magnesium, with the balance being copper and minor impurities); and copper alloy 110; and stainless steel. Materials should remain stable within the cell even after the non-aqueous electrolyte is added. Examples of metals generally to be avoided but can be present as impurities in relatively minor amounts are aluminum and zinc.

The cathode is in the form of a strip that comprises a current collector and a mixture that includes one or more electrochemically active materials, usually in particulate form. Iron disulfide ($FeS_2$) is a preferred active material although the invention is applicable to most cathode materials that are stable with LiI and have a potential vs. Li that is less than 2.5V, including CuO, $CuO_2$ and all oxides of bismuth (e.g., $Bi_2O_3$, etc.). Notably, $MnO_2$ is not suitable because it has a potential that is too high when compared to LiI.

In a $LiFeS_2$ cell, the cathode active material comprises greater than 50 weight percent $FeS_2$. The cathode can also contain one or more additional active materials mentioned above, depending on the desired cell electrical and discharge characteristics. More preferably the active material for a $LiFeS_2$ cell cathode comprises at least 95 weight percent $FeS_2$, and most preferably $FeS_2$ is the sole active cathode material. $FeS_2$ having a purity level of at least 95 weight percent is available from Washington Mills, North Grafton, Mass., USA; Chemetall GmbH, Vienna, Austria; and Kyanite Mining Corp., Dillwyn, Va., USA. A more comprehensive description of the cathode, its formulation and a manner of manufacturing the cathode is provided below.

The current collector may be disposed within or imbedded into the cathode surface, or the cathode mixture may be coated onto one or both sides of a thin metal strip. Aluminum is a commonly used material. The current collector may extend beyond the portion of the cathode containing the cathode mixture. This extending portion of the current collector can provide a convenient area for making contact with the electrical lead connected to the positive terminal. It is desirable to keep the volume of the extending portion of the current collector to a minimum to make as much of the internal volume of the cell available for active materials and electrolyte.

The cathode is electrically connected to the positive terminal of the cell. This may be accomplished with an electrical lead, often in the form of a thin metal strip or a spring, as shown in FIG. 1, although welded connections are also possible. The lead is often made from nickel plated stainless steel. Still another embodiment may utilize a connection similar to that disclosed in U.S. patent application Ser. No. 11/439,835, which should publish on or after Nov. 29, 2007, and/or U.S. patent application Ser. No. 11/787,436, which should publish on or after Oct. 16, 2008, both of which are commonly assigned to the assignee of this application and incorporated by reference herein. Notably, to the extent a cell design may utilize one of these alternative electrical connectors/current limiting devices, the use of a PTC may be avoided. In the event an optional current limiting device, such as a standard PTC, is utilized as a safety mechanism to prevent runaway discharge/heating of the cell, a suitable PTC is sold by Tyco Electronics in Menlo Park, Calif., USA. Other alternatives are also available.

Separator

The separator is a thin microporous membrane that is ion-permeable and electrically nonconductive. It is capable of holding at least some electrolyte within the pores of the separator. The separator is disposed between adjacent surfaces of the anode and cathode to electrically insulate the electrodes from each other. Portions of the separator may also insulate other components in electrical contact with the cell terminals to prevent internal short circuits. Edges of the separator often extend beyond the edges of at least one electrode to insure that the anode and cathode do not make electrical contact even if they are not perfectly aligned with each other. However, it is desirable to minimize the amount of separator extending beyond the electrodes.

To provide good high power discharge performance it is desirable that the separator have the characteristics (pores with a smallest dimension of at least 0.005 µm and a largest dimension of no more than 5 µm across, a porosity in the range of 30 to 70 percent, an area specific resistance of from 2 to 15 ohm-cm$^2$ and a tortuosity less than 2.5) disclosed in U.S. Pat. No. 5,290,414, issued Mar. 1, 1994, and hereby incorporated by reference.

Suitable separator materials should also be strong enough to withstand cell manufacturing processes as well as pressure that may be exerted on the separator during cell discharge without tears, splits, holes or other gaps developing that could result in an internal short circuit. To minimize the total separator volume in the cell, the separator should be as thin as possible, preferably less than 25 µm thick, and more preferably no more than 22 µm thick, such as 20 µm or 16 µm. A high tensile stress is desirable, preferably at least 800, more preferably at least 1000 kilograms of force per square centimeter (kgf/cm$^2$). For an FR6 type cell the preferred tensile stress is at least 1500 kgf/cm$^2$ in the machine direction and at least 1200 kgf/cm$^2$ in the transverse direction, and for a FR03 type cell the preferred tensile strengths in the machine and transverse directions are 1300 and 1000 kgf/cm$^2$, respectively. Preferably the average dielectric breakdown voltage will be at least 2000 volts, more preferably at least 2200 volts and most preferably at least 2400 volts. The preferred maximum effective pore size is from 0.08 µm to 0.40 µm, more preferably no greater than 0.20 µm. Preferably the BET specific surface area will be no greater than 40 m$^2$/g, more preferably at least 15 m$^2$/g and most preferably at least 25 m$^2$/g. Preferably the area specific resistance is no greater than 4.3 ohm-cm$^2$, more preferably no greater than 4.0 ohm-cm$^2$, and most preferably no greater than 3.5 ohm-cm$^2$. These properties are described in greater detail in U.S. Patent Publication No. 2005/0112462, which is hereby incorporated by reference.

Separator membranes for use in lithium batteries are often made of polypropylene, polyethylene or ultrahigh molecular weight polyethylene, with polyethylene being preferred. The separator can be a single layer of biaxially oriented microporous membrane, or two or more layers can be laminated together to provide the desired tensile strengths in orthogonal directions. A single layer is preferred to minimize the cost. Suitable single layer biaxially oriented polyethylene microporous separator is available from Tonen Chemical Corp., available from EXXON Mobile Chemical Co., Macedonia, N.Y., USA. Setela F20DHI grade separator has a 20 µm nominal thickness, and Setela 16MMS grade has a 16 µm nominal thickness. Suitable separators with similar properties are also available from Entek Membranes in Lebanon, Oreg., USA.

Cell Construction and Manufacture

The anode, cathode and separator strips are combined together in an electrode assembly. The electrode assembly may be a spirally wound design, such as that shown in FIG. 1, made by winding alternating strips of cathode, separator, anode and separator around a mandrel, which is extracted from the electrode assembly when winding is complete. At least one layer of separator and/or at least one layer of electrically insulating film (e.g., polypropylene) is generally wrapped around the outside of the electrode assembly. This serves a number of purposes: it helps hold the assembly together and may be used to adjust the width or diameter of the assembly to the desired dimension. The outermost end of the separator or other outer film layer may be held down with a piece of adhesive tape or by heat sealing. The anode can be the outermost electrode, as shown in FIG. 1, or the cathode can be the outermost electrode. Either electrode can be in electrical contact with the cell container, but internal short circuits between the outmost electrode and the side wall of the container can be avoided when the outermost electrode is the same electrode that is intended to be in electrical contact with the can.

The cell can be closed and sealed using any suitable process. Such processes may include, but are not limited to, crimping, redrawing, collecting and combinations thereof. For example, for the cell in FIG. 1, a bead is formed in the can after the electrodes and insulator cone are inserted, and the gasket and cover assembly (including the cell cover, contact spring and vent bushing) are placed in the open end of the can. The cell is supported at the bead while the gasket and cover assembly are pushed downward against the bead. The diameter of the top of the can above the bead is reduced with a segmented collet to hold the gasket and cover assembly in place in the cell. After electrolyte is dispensed into the cell through the apertures in the vent bushing and cover, a vent ball is inserted into the bushing to seal the aperture in the cell cover. A PTC device and a terminal cover are placed onto the cell over the cell cover, and the top edge of the can is bent inward with a crimping die to hold retain the gasket, cover assembly, PTC device and terminal cover and complete the sealing of the open end of the can by the gasket.

With respect to the cathode, the cathode is coated onto a metallic foil current collector, typically an aluminum foil with a thickness between 18 and 20 µm, as a mixture which contains a number of materials that must be carefully selected to balance the processability, conductivity and overall efficiency of the coating. This coating consists primarily of iron disulfide (and its impurities); a binder that is generally used to hold the particulate materials together and adhere the mixture to the current collector; one or more conductive materials such as metal, graphite and carbon black powders added to provide improved electrical conductivity to the mixture, although the amount of conductor depends upon the electrical conductivity of the active material and binder, the thickness of the mixture on the current collector and the current collector design; and various processing or rheological aids that are dependent upon the coating method, the solvent used and/or the mixing method itself.

The following are representative materials that may be utilized in the cathode mix formulation: pyrite (at least 95% pure); conductor (Pure Black 205-110 from Superior Graphite Chicago, Ill., and/or MX15 from Timcal Westlake, Ohio); and binder/processing aids (styrene-ethylene/butylenes-styrene (SEBS) block copolymer, such as g1651 from Kraton Polymers Houston, Tex., and Efka 6950 from Heerenveen, Netherlands). Small amounts of impurities may be naturally present in any of the aforementioned materials, although care should be taken to utilize the highest purity pyrite source available so as to maximize the amount of $FeS_2$ present within the cathode.

It is also desirable to use cathode materials with small particle sizes to minimize the risk of puncturing the separator. For example, $FeS_2$ is preferably sieved through a 230 mesh (62 μm) screen before use or the $FeS_2$ may be milled or processed as described in U.S. Patent Publication No. 2005/0233214, which is incorporated by reference herein. Other cathode mix components should be carefully selected with eye toward chemical compatibility/reactivity and to avoid similar particle-size-based mechanical failure issues.

The cathode mixture is applied to the foil collector using any number of suitable processes, such as three roll reverse, comma coating or slot die coating. The methods of coating described in U.S. patent application Ser. No. 11/493,314, which should publish on or after Jan. 31, 2008 and is incorporated by reference, could be used. One preferred method of making $FeS_2$ cathodes is to roll coat a slurry of active material mixture materials in a highly volatile organic solvent (e.g., trichloroethylene) onto both sides of a sheet of aluminum foil, dry the coating to remove the solvent, calender the coated foil to compact the coating, slit the coated foil to the desired width and cut strips of the slit cathode material to the desired length. The use of volatile solvents maximize the efficiency of recovering such solvents, although it is possible to utilize other solvents, including aqueous-based compositions, in order to roll coat the cathode mix described above.

After or concurrent with drying to remove any unwanted solvents, the resulting cathode strip is densified via calendering or the like to further compact the entire positive electrode. In light of the fact that this strip will then be spirally wound with separator and a similarly (but not necessarily identically) sized anode strip to form a jellyroll electrode assembly, this densification maximizes loading of electrochemical material in the jellyroll electrode assembly. However, the cathode cannot be over-densified as some internal cathode voids are need to allow for expansion of the iron disulfide during discharge and wetting of the iron disulfide by the organic electrolyte, as well as to avoid unwanted stretching and/or de-lamination of the coating.

EXAMPLE 1

A series of $LiFeS_2$ cells were constructed according to the design depicted in FIG. 1 and the preferred materials described above. Polypropylene gaskets were used. The solvent blend was 65 vol. % DIOX, 35 vol. % DME and 0.2 vol. % DMI. Only the concentration and composition of solute provided to these cells was varied, as described in the tables and further examples below.

Four different solutes were studied: lithium iodide, lithium imide, lithium perchlorate and lithium triflate. Cell lots for each solute were formulated at four different concentration levels using the criteria set forth above. These cells were then discharged at a variety of different temperatures, as set forth in Table 1 below. The cells using $LiClO_4$ were not tested at 21° C., but typically such cells give comparable performance to equivalent electrolytes using LiI at that temperature.

TABLE 1

1A Continuous Drain at Varying Temperatures and Concentrations. (mAh to 0.9 V cut)

| Solute | Molality | −40° C | −20° C. | 21° C |
|---|---|---|---|---|
| Lithium | 0.50 | 1,172 | 2,056 | 2,716 |
| Iodide | 0.75 | 2 | 2,133 | 2,872 |
|  | 1.00 | 2 | 2,055 | 2,932 |
|  | 1.25 | 1 | 6 | 2.903 |
| Lithium | 0.67 | 333 | 1,030 | 1,576 |
| Triflate | 0.80 | 494 | 1,280 | 1,890 |
|  | 1.00 | 131 | 1,439 | 2,150 |
|  | 1.33 | 231 | 1,734 | 2,539 |
|  | 1.67 | 12 | 1,426 | 2.652 |
| Lithium | 0.50 | 41 | 2,428 |  |
| Perchlorate | 0.60 | 37 | 2,409 |  |
|  | 0.75 | 1 | 2,314 |  |
|  | 1.00 | 0 | 2,213 |  |
|  | 1.25 | 0 | 2,656 |  |
| Lithium | 0.50 | 1,214 | 1,917 | 2,929 |
| Imide | 0.75 | 878 | 2,475 | 3,053 |
|  | 1.00 | 1,049 | 2,433 | 3,020 |
|  | 1.25 | 849 | 2,232 | 3,030 |

The data above demonstrates that lithium perchlorate and lithium triflate do not provide adequate service across the entire spectrum of temperatures. Even within the range of lithium iodide concentrations studied, only the lowest molality electrolyte demonstrated consistent performance without significant degradation of performance at ambient temperatures. While lithium imide appears to provide acceptable service across the range, it does not display any definitive trends with respect to the concentration of solute provided (excepting, perhaps, at room temperature, where there is a slight advantage to providing higher concentrations). The imide's cost also places it a disadvantage in comparison to the other solutes.

EXAMPLE 2

Given the results of Example 1, lithium imide electrolytes were compared against lithium iodide to test the electrolyte's ability to withstand long term storage and storage at elevated temperatures. It is believed storage at elevated temperatures accelerates and simulates the effects of long term storage at room temperature. Notably, cells must display only a minimal rise in its impedance and OCV, while maintaining acceptable flash amperage, in order to provide adequate long term storage.

Cells were made according to Example 1 above, but focusing on lithium imide electrolyte formulations, which are still benchmarked against lithium iodide, whose viability for long term storage is already well known/established (FR6 cells with lithium iodide have a shelf life of at least 10-15 years). The cells of this Example 2 were then stored at 60° C. for 6 weeks, while being periodically checked for OCV, impedance and flash amperage, as set forth in Table 2 below.

TABLE 2

Comparison of Long Term Storage Traits at 60° C.

| Electrolyte | No. Weeks Stored | OCV (volts) | 10 Hz Impedance | Flash Amps |
|---|---|---|---|---|
| 0.75 m Iodide | 0 | 1.771 | 0.122 | 15.6 |
| (control) | 1 | 1.827 | 0.139 | 16.8 |
|  | 2 | 1.836 | 0.155 | 16.1 |

TABLE 2-continued

Comparison of Long Term Storage Traits at 60° C.

| Electrolyte | No. Weeks Stored | OCV (volts) | 10 Hz Impedance | Flash Amps |
|---|---|---|---|---|
| | 4 | 1.854 | 0.189 | 14.9 |
| | 6 | 1.857 | 0.221 | 13.4 |
| 0.50 m Imide | 0 | 1.784 | 0.174 | 15.1 |
| | 1 | 1.850 | 0.169 | 15.3 |
| | 2 | 1.856 | 0.217 | 14.1 |
| | 4 | 1.871 | 0.418 | 10.8 |
| | 6 | 1.878 | 0.580 | 9.6 |
| 0.75 m Imide | 0 | 1.791 | 0.150 | 15.7 |
| | 1 | 1.857 | 0.143 | 17.0 |
| | 2 | 1.860 | 0.165 | 16.3 |
| | 4 | 1.871 | 0.245 | 13.6 |
| | 6 | 1.873 | 0.308 | 11.9 |
| 1.00 m Imide | 0 | 1.796 | 0.183 | 16.0 |
| | 1 | 1.861 | 0.209 | 16.2 |
| | 2 | 1.863 | 0.260 | 15.5 |
| | 4 | 1.875 | 0.416 | 12.6 |
| | 6 | 1.875 | 0.527 | 11.4 |
| 1.25 m Imide | 0 | 1.797 | 0.160 | 15.8 |
| | 1 | 1.861 | 0.184 | 16.4 |
| | 2 | 1.863 | 0.223 | 15.9 |
| | 4 | 1.875 | 0.332 | 13.4 |
| | 6 | 1.876 | 0.433 | 12.3 |

While all lots studied displayed some negative effects after long term storage, virtually all of the imide lots, irrespective of concentration, displayed significantly worse performance as compared to the iodide. Therefore, lithium imide may not provide enough long term storage capability to meet consumer expectations.

In comparison, long term storage data for low molality LiI electrolytes are shown in Table 3 below. Note that these figures were generated in a separate experiment, although comparative context is provided by a "control" lot of 0.75 m LiI electrolyte, although restraints on resources prevented conducting this experiment beyond 4 weeks of storage time. On the balance, the control lot performed slightly worse in Table 3 as compared to Table 2, and the 0.35 m Iodide lot's performance may have been similarly degraded. More significantly, the flash amps for the low molality lot did not appear to degrade with storage time, and the increase in impedance was significantly less as compared to the increase over a similar period of time for all imide lots from Example 2.

TABLE 3

Long Term Storage Traits for Low Molality LiI at 60° C.

| Electrolyte | No. Weeks Stored | OCV (Volts) | 10 Hz Impedance | Flash Amps |
|---|---|---|---|---|
| 0.75 m Iodide | 0 | 1.766 | 0.035 | 15.5 |
| (control) | 1 | 1.841 | 0.082 | 15.5 |
| | 2 | 1.842 | 0.106 | 15.3 |
| | 4 | 1.851 | 0.115 | 13.0 |
| 0.35 m Iodide | 0 | 1.765 | 0.080 | 10.3 |
| | 1 | 1.858 | 0.141 | 9.9 |
| | 2 | 1.863 | 0.152 | 10.9 |
| | 4 | 1.870 | 0.150 | 10.2 |

EXAMPLE 3

A further study of low concentrations of lithium iodide was conducted across the range of temperatures to confirm both the benefits achieved at low temperature and the level of service provided at ambient temperatures. Accordingly, cells were made according to Example 1 above at 0.40 molal, 0.50 molal and 0.75 molal LiI concentrations, with the results shown for various temperatures in FIGS. 2A, 2B, 2C and 2D. Note that "DSC" in FIG. 2D refers to the ANSI digital still camera test, an intermittent pulsing drain rate test. The "Signature Test" in FIGS. 2A, 2B and 2C refers to a sequential continuous drain rate test where the cell is progressively discharged to a predetermined cutoff voltage, then retested at a lower drain rate after a rest period. In each of FIGS. 2A, 2B, 2C and 2D, the "control" electrolyte is a 0.75 m LiI formulation and virtually all electrolytes in these Figures used a solvent blend identical to the blend of Example 1.

Figure 2A:
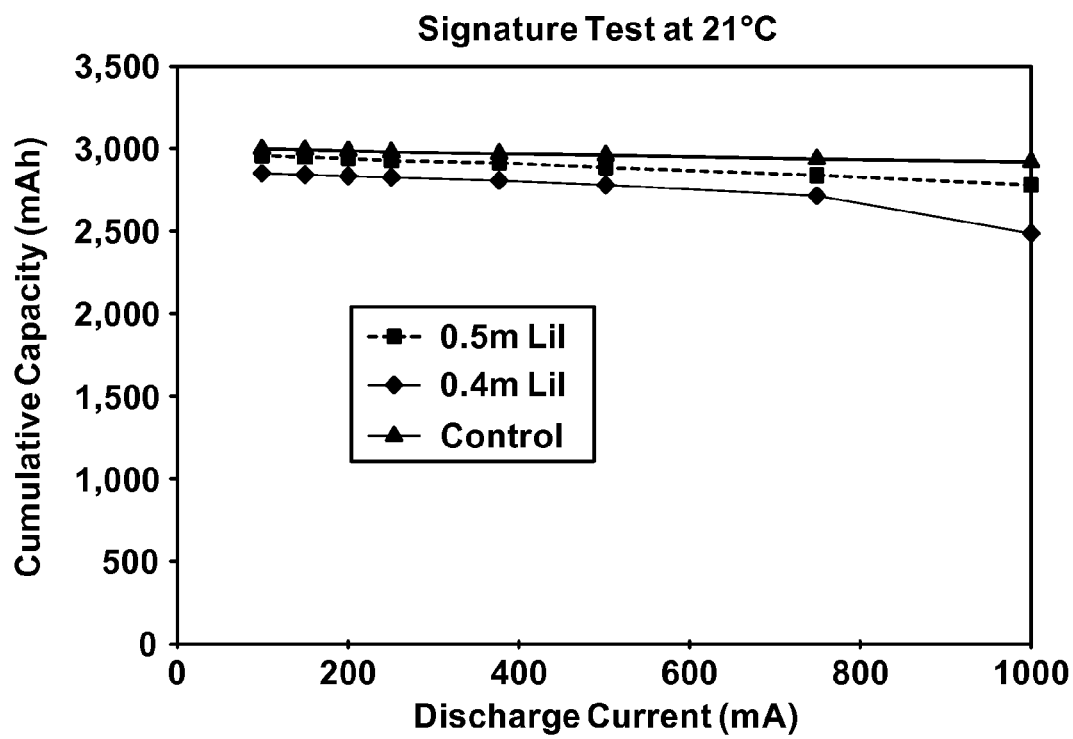
FIGS. 2A, 2B, 2C and 2D show the results of LiI-based electrolytes with varying salt concentrations incorporated into FR6 cells that are discharged under varying drain rates and temperatures.
Figure 2B:
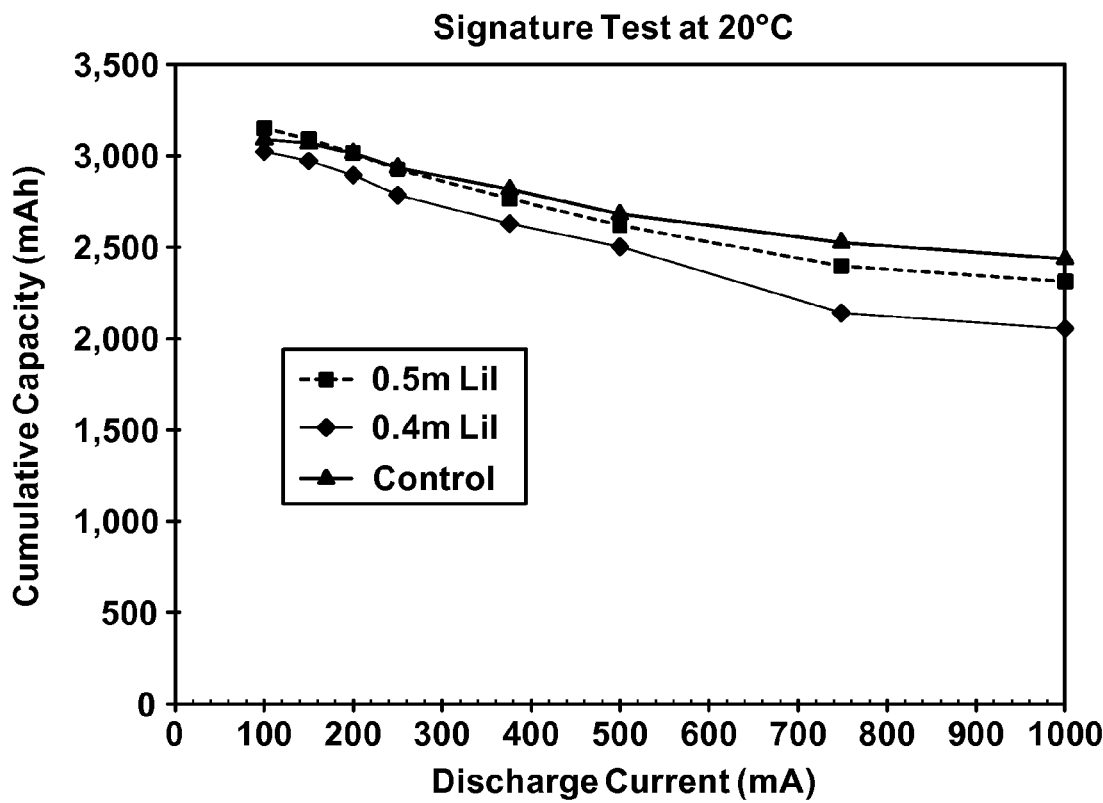
Figure 2C:
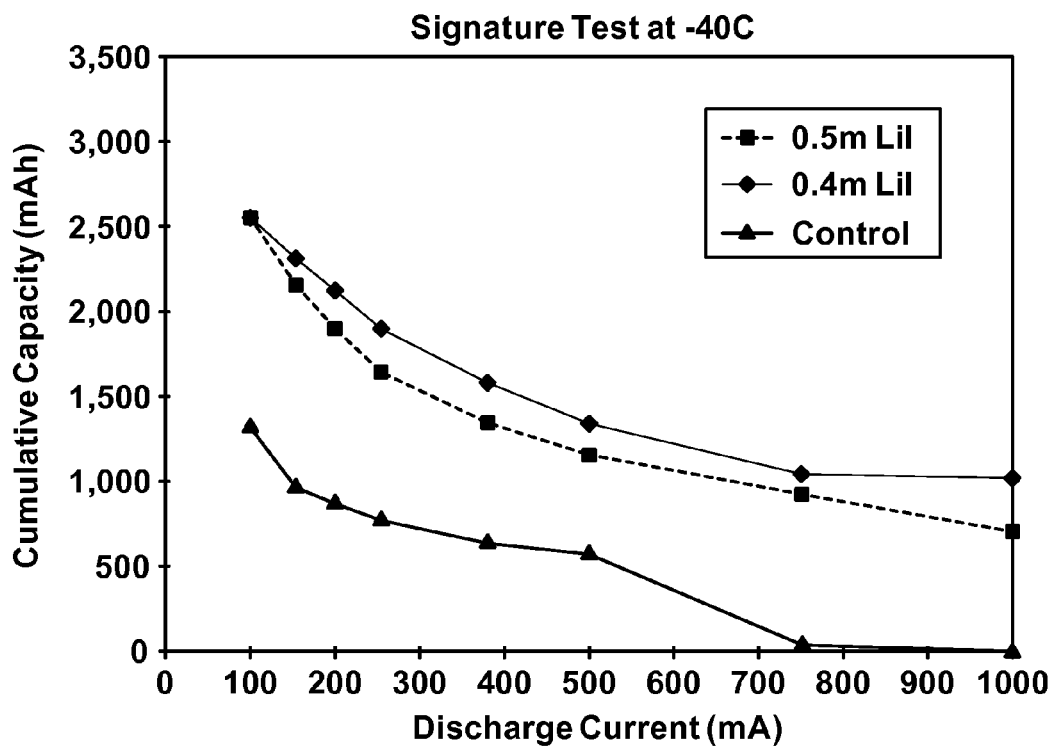
Figure 2D:
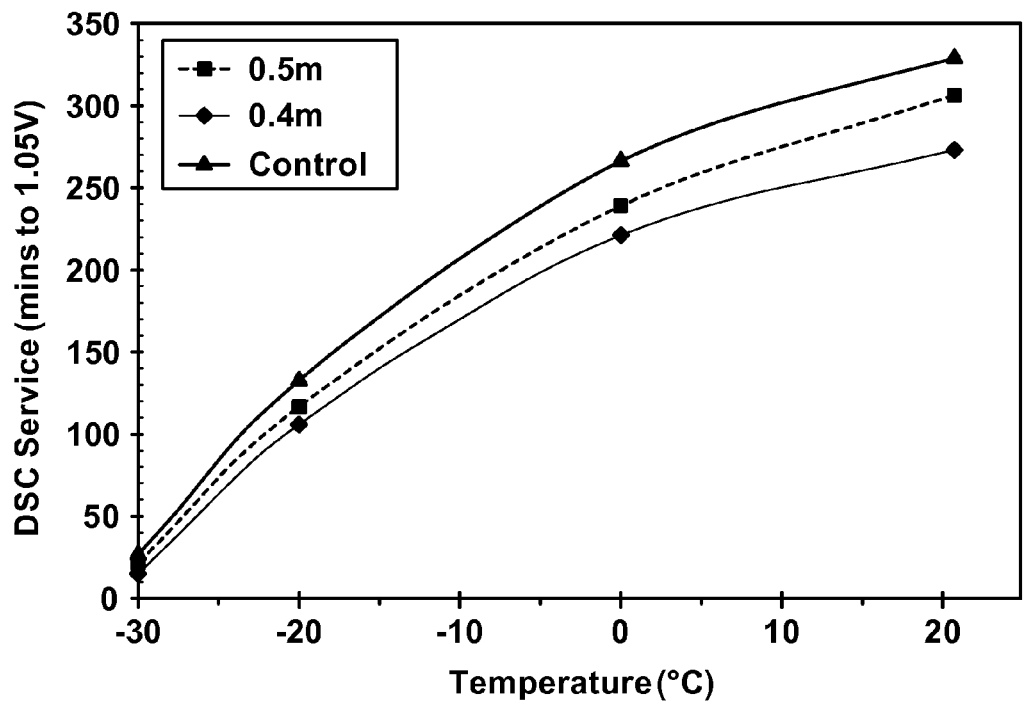

Note that the room temperature (21° C.) and −20° C. data in FIGS. 2A and 2B is roughly comparable for all electrolytes, although there is slightly better service from the higher concentration electrolytes at higher drain rates (i.e., 1000 mA continuous and DSC). However, this slightly better service at higher temperatures pales in comparison to the vastly superior performance of the low molality electrolyte on all drain rates tested at −40° C. as shown in FIG. 2C. FIG. 2D merely illustrates the comparative performance of the electrolytes on the DSC test across a range of temperatures.

EXAMPLE 4

Another lot of cells were constructed with identical features but also including an electrode assembly designed to deliver more capacity, irrespective of electrolyte blend. Here the LiI electrolytes were provided at 0.75 m, 0.5 m and 0.35 m. These cells were drained at a continuous 200 mA rate at two separate temperatures. The 0.75 m cells provided 2,933 mAh to a 1V cut at 21° C. but only 203 mAh to a 1V cut at −40° C. The 0.5 m cells yielded 2,917 mAh and 617 mAh and the 0.35 m cells 2,847 mAh and 1,343 mAh, respectively speaking. As such, the electrolyte according to the invention provided over 97% of the capacity demonstrated of the prior art at ambient temperature, while delivering a 300% to 600% improvement over the prior art at low temperature, even when that prior art electrolyte was used in conjunction with an electrode specifically made for low temperature performance.

When all of the data is considered in total, the lower concentration electrolytes perform at nearly the same level as the prior art formulation; however, quite unexpectedly, at low temperature and higher drain rates, these low concentration formulations perform well beyond the expected service levels.

EXAMPLE 5

Low concentration (0.35 m) lithium lithium iodide electrolytes according to the invention were incorporated into the cell design and construction discussed in Example 1, along with control electrolytes (0.75 m). The undischarged cells were then monitored for temperature increase during impact and crush tests—extremely important metrics for safety in the LiFeS$_2$ battery field. 10 batteries from each lot were monitored for temperature rise on impact, with the lower concentration electrolyte cells averaging a maximum high of 57.2° C. as compared to 72.6° C. for the controls. 20 batteries from each lot were monitored for high temperature on the crush test, with the average low concentration cells at 26.5° C. and the control lot at 38.9° C.

Features of the invention and its advantages will be further appreciated by those practicing the invention, particularly with reference to the Examples, Figures, Tables and other information provided herein and any patent references above necessary to better understand the invention are incorporated herein to that extent. In the same manner, it will be understood by those who practice the invention and those skilled in the art that various modifications and improvements may be made to the invention without departing from the spirit of the disclosed concepts. The scope of protection afforded is to be determined by the claims and by the breadth of interpretation allowed by law.

I claim:

1. An electrochemical cell comprising
    an anode consisting essentially of lithium or a lithium alloy;
    a cathode comprising iron disulfide coated on a current collector;
    a separator disposed between the anode and the cathode, wherein the anode, the cathode and the separator are spirally wound into a jellyroll electrode assembly;
    an electrolyte having 0.5 molal or less of lithium iodide dissolved in a solvent blend consisting essentially of at least 50 volume percent 1,3-dioxolane and at least one acylic ether consisting essentially of one or more organic solvents selected from the group consisting of: methyl formate, γ-butyrolactone, sulfolane, acetonitrile, N,N-dimethyl formamide, N,N-dimethylacetamide, N,N-dimethylpropyleneurea, 1,1,3,3-tetramethylurea, beta aminoenones, beta aminoketones, methyltetrahydrofurfuryl ether, diethyl ether, tetrahydrofuran, 2-methyl tetrahydrofuran, 2-methoxytetrahydrofuran and 2,5-dimethoxytetrahydrofuran; and
    wherein the cell delivers on a $C_{15}$ continuous discharge rate at a temperature of about −40° C. at least 30% the capacity that identically constructed cells give on the same test at a temperature of about 21° C.

2. The electrochemical cell of claim 1, wherein the electrolyte has about 0.35 molal or less of solute.

3. The electrochemical cell of claim 1, wherein the solvent blend has between 60 to 70 volume percent of 1,3-dioxolane.

* * * * *